United States Patent [19]

Saunders et al.

[11] 3,859,451

[45] Jan. 7, 1975

[54] PREPARATION OF STABLE PROTEIN CONCENTRATES FROM GRAIN BY-PRODUCTS

[75] Inventors: Robert M. Saunders, Berkeley; George O. Kohler, El Cerrito; Margaret A. Connor, Concord; Richard H. Edwards, Albany, all of Calif.

[73] Assignee: The United States of America as represented by the Secretary of Agriculture, Washington, D.C.

[22] Filed: Sept. 24, 1973

[21] Appl. No.: 399,892

Related U.S. Application Data

[63] Continuation-in-part of Ser. No. 283,690, Aug. 25, 1972.

[52] U.S. Cl. ................ 426/364, 426/373, 426/431, 426/481
[51] Int. Cl. ............................................. A23j 1/12
[58] Field of Search ........... 426/364, 373, 375, 459, 426/436, 463, 481, 431; 260/112 G

[56] References Cited

UNITED STATES PATENTS

| | | | |
|---|---|---|---|
| 2,455,981 | 12/1948 | Dimler | 260/112 G |
| 2,597,566 | 5/1952 | Chiego et al. | 426/364 |
| 3,185,574 | 5/1965 | Gabby et al. | 426/152 |

OTHER PUBLICATIONS

Simmons, N.O., "Feed Milling," Leonard Hill Ltd., London, 1963, p. 9.

*Primary Examiner* — Raymond N. Jones
*Assistant Examiner* — R. A. Yoncoskie
*Attorney, Agent, or Firm* — M. Howard Silverstein; Max D. Hensley; William Takacs

[57] ABSTRACT

Stable protein concentrates are prepared from wheat millfeed by a process which comprises blending the millfeed with aqueous alkali, separating a juice containing soluble protein and suspended starch and fat therefrom, and coagulating and separating a solid protein concentrate from the so-separated juice.

4 Claims, No Drawings

PREPARATION OF STABLE PROTEIN CONCENTRATES FROM GRAIN BY-PRODUCTS

This is a continuation-in-part of our co-pending application, Ser. No. 283,690, filed Aug. 25, 1972.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel processes for fractionating wheat millfeed, whereby to obtain a stable, food-grade protein concentrate. Further objects of the invention will be evident from the following description wherein parts and percentages are by weight unless otherwise specified.

In the milling of wheat to produce flour and germ, several grinding and sifting steps are employed, whereby purified flour and germ are separated from other fragments of the wheat kernel. These other fragments are referred to as millfeed, an inclusive term for wheat bran and shorts. The millfeed comprises about 22% of the kernel and contains approximately 20% of the protein. In addition, the millfeed contains a high percentage of the B-complex vitamins in the kernel of wheat, such as niacin, (86%), pyridoxine (73%), pantothenic acid (50%), riboflavin (42%), and thiamine (33%). However, because of its high fiber and ash content the millfeed is not suitable for human nutritional needs. The millfeed contains about 10% cellulosic material and 6% ash, which tend to accelerate the passage of the food through the human digestive tract. Consequently, only a small nutritive contribution is realized. Thus, millfeed is useful only as feed for ruminant animals, to whom the nutrients are more available.

The invention described herein provides a means for obviating the problem outlined above. As a result of the invention, the proteins, starch, fat, and vitamins of the wheat millfeed can be concentrated, that is, separated from the undesirable fibrous material and ash. Thus, the process of the invention provides means for removing fiber and ash from the millfeed, thereby making the nutrients of the millfeed more available. The product of the invention is almost entirely digestible by humans. In addition to a high percentage of protein and vitamins, the final product also contains a considerable proportion of starch and fat. Hence, a well-balanced food is produced.

In the following description, application of the methods of the invention to wheat millfeeds is discussed. It should be noted that this is by way of illustration, not limitation. In its broad ambit the processes of the invention can be applied to millfeed from the production of corn starch, rice flour, etc. The invention may be applied with particular success to millfeed and other wastes from grain operations that already contain water, sush as brewer's waste, distiller's grains, and the like.

The process of the invention is now described in detail.

In a first step the millfeed is mixed with alkali to attain a pH of 8 to 10. Ammonia, ammonium hydroxide, sodium and potassium hydroxide, and the like are suitable. Ammonia is preferred because the added nitrogen, carried over in the branny residue after separation of the protein concentrate, is beneficial to ruminant animals. In applying the alkalizer, it is preferably dissolved in water and the resulting aqueous solution mixed with the millfeed. Water is applied in the proportion of 3 to 5 lbs. thereof per pound of millfeed. Contact between the water and alkalizer is maintained for about 10 to 20 minutes. In a preferred embodiment of the invention the millfeed is first mixed with aqueous alkali and the mixture is subjected to blending action, that is, intensive mixing coupled with application of vigorous and repeated shearing action. Either sodium or potassium bisulfite may be added at this point to further improve the yield of protein concentrate. Generally, 0.1 to 1.0% of bisulfite is added, based on the weight of millfeed. In addition to improved yield, incorporation of bisulfite ion results in a product with improved properties. In particular, the product is lightcolored and exhibits an increased value for metabolizable energy when employed as a chick feed.

Following treatment with alkali, the mixture is filtered under high pressure using a porous bag known in the art as a filter cloth. Generally, pressures of 25 to 100 psi are employed. However, it should be pointed out that any conventional means for separating juice from solids can be used. Thus, centrifugation is an alternative to the filtration described above. Other methods will be apparent to those skilled in the art.

Next, the pH of the juice from above is adjusted to about 5.5 to 6.0 by the application of acid. Any food-grade acid can be used. Thus, one may apply hydrochloric acid, sulfuric acid, phosphoric acid, citric acid, tartaric acid, and the like to achieve the desired pH.

Following the pH adjustment, steam is applied to the juice to attain a temperature of 85° C. Application of steam can be accomplished by injecting steam into the juice, although other conventional methods can also be used. The steam acts to coagulate the product of the invention. Coagulation may also be effected by other means. For example, acid may be applied to a pH of about 3.5. Likewise, another method for coagulating the product is to add ethyl alcohol until the concentration thereof approaches 70%. Those skilled in the art undoubtedly will think of other methods for effecting coagulation.

The coagulated product is collected by such conventional procedures as centrifugation and decantation, filtration, etc. Following its collection, the wet product is dried by methods such as drum-drying, freeze-drying and the like. Preferably, the collected material is washed with water prior to drying to further reduce its content of ash. Approximately 5 to 10 parts of water per one part of product is used in this washing operation.

The dried product has the following approximate composition: Protein (39%), fat (10%), fiber (0.5%), ash (2.0%), starch (46%), and water (2.5%). The product of the invention is useful to fortify foods such as cereals, soups, gravies, stews, sauces, etc., and beverages. In addition, the product can be mixed with flour to yield a fortified material useful for baking and the like.

The branny residue after protein concentration can be dried and used as an animal or poultry feed. This residue contains protein (14%), fat (1.3%), fiber (13.2%), starch (12.6%), ash (4%, and water (11%).

One advantage of the invention is that the product contains a high percentage of fat and many fat-soluble vitamins. Thus, a material balanced in its protein, starch, and fat content is obtained. In addition, the instant product exhibits an extremely important characteristic, which can be explained as follows: Although the proportion of fat is high, the product does not air-oxidize, i.e., become rancid, when stored for prolonged periods. The instant product contains small amounts of a natural antioxidant, an alkyl resorcinol, which is extracted from the millfeed together with the proteins and other materials. For instance, the product described in Example 1 contains 0.03% (by weight) of this antioxidant. Furthermore, the product of the invention deters rancidity when added to foods capable of becoming rancid.

Another advantage of the invention is that the starch content can be reduced with the concomitant increase in protein content by the following process: After separating the juice from the solid material, the juice is centrifuged, whereby much of the starch is removed. Lowering the pH to about 3.0–3.5 with acid precipitates a protein concentrate, which gave the following analysis after washing and drying: Protein (68.7%), fat (20.3%), fiber (0.6%), ash (2.4%), starch (<1%), and water. This material has a very high protein concentration, thus making it considerably more valuable as a food-fortifier. It is important to note that the protein content can be increased further by combining the steps of starch removal and initial treatment with bisulfite ion.

It is a further advantage of the invention that the process can be conducted in a continuous operation. Continuity can be realized by recycling the juices that remain after coagulation of the protein product. Thus, in a typical continuous operation millfeed is blended with aqueous alkali containing a small amount of bisulfite ion. The mixture is filtered as described above and the resultant juice is treated to coagulate a protein product. The product is separated from the juice, which is combined with a small amount of water and reused in the initial blending operation. The recycling can be repeated any number of times, but, generally, the yield of product is optimum after seven to 10 cycles. Usually, the juice to be recycled is diluted with water in a ratio of one part water per 5 to 10 parts of juice prior to reuse. Several economic advantages result from a continuous operation. Recycling the juices in a non-stop operation minimizes the use of water. In addition, the yield of product is increased. The amount of water required for a continuous operation can be calculated from the formula: $y = x(1.89n + 4)$ where $y$ = weight of water, $x$ = weight of millfeed, and $n$ = number of cycles.

The invention is further demonstrated by the following illustrative examples.

EXAMPLE 1

Preparation of Stable Protein Concentrate from Wheat Millfeed

A. Wheat millfeed (100 g.) was placed in 500 ml. of water. Concentrated ammonium hydroxide was introduced into the mixture until a pH of 9 was obtained. At this point the mixture was held for 15 minutes and placed in a filter cloth bag. A pressure of 100 psi was applied to the mixture to force the juice through the porous filter cloth; 420 ml. of juice was obtained. The juice was treated with 1 N hydrochloric acid to adjust the pH to 5.8. Steam was injected into the juice until the temperature there of reached 85° C. The product, which had coagulated, was collected by centrifugation and drum-dried to give 20 g. of protein concentrate. The product analyzed as follows: Protein (39%), fat (10.5%), fiber (ash (4%), starch (36%), unidentified water-solubles (7.5%). and water (205%).

This product was washed with 100 ml. of water and then redried. Sixteen grams of protein concentrate was obtained and gave the following analysis: Protein (40%), fat (10%), fiber (0.5%), ash (2%), starch (46%), and water (2.5%).

The residue from the filter cloth was dried and analyzed as follows: Protein (14%), fat (1.3%), fiber (13.2%), ash (4%), starch (12.6%), water (11%), and other material including pentosans, cellulose, etc. (43.9%). (This material is useful as an animal feed.)

B. Alternatively, 100 g. of wheat millfeed was placed in 500 ml. of water and 3 N sodium hydroxide was added to maintain a pH of about 8.6. The mixture was subjected to mild agitation in a blendor for 15 minutes. The product was filtered as in Part A and 410 ml. of juice was obtained. The pH of the juice was adjusted to 6.0 with 1 N hydrochloric acid and steam was injected as in Part A. The product was collected and dried to yield 21.8 g. of protein concentrate.

C. Alternatively, 100 g. of wheat millfeed was added to 500 ml. of water containing 0.1 g. of sodium bisulfite and 3 N sodium hydroxide was added to maintain a pH of about 8.6. The mixture was stirred gently for 15 minutes and 435 ml. of juice was obtained after filtration and processed as in Part B above.

The above process was repeated, using 0.0 g., 0.2 g., and 0.5 g. of sodium bisulfite. The results are tabulated below.

| Bisulfite (%) | Yield (g.) | ΔE* (color) |
|---|---|---|
| 0 | 18.60 | 19.59 |
| 0.1 | 19.10 | 16.56 |
| 0.2 | 19.32 | 15.88 |
| 0.5 | 20.00 | 12.20 |

* ΔE is the difference in color between a standard color and the color of any particular sample. Measurements were made on a Hunterlab D25 Color Difference Meter. The standard employed was No. D33C-157 from Hunter Associates Laboratory, Inc., Fairfax, Virginia. Lower values for ΔE represent lighter-colored samples and, therefore, are desirable.

EXAMPLE 2

Preparation of Stable Protein concentrate of Low Starch Content from Wheat Millfeed A. The procedure outlined in Example 1, Part A, was followed. After pressing through a filter cloth, the juice was centrifuged, whereby to remove most of the starch. Then, the pH of the decanted juice was lowered to 3.5 by adding 1 N hydrochloric acid. The coagulated product (9.7 g.) was collected by centrifugation and drum-dried; it analyzed as follows: Protein (65.7%), fat (17.3%), fiber (0.5%), ash (3.4%), water (2.2%), and starch and unidentified water-solubles (10.9%). This product was washed with 100 ml. of water and redried to give 7.9 g. of material that had the following analysis: Protein (68.7%), fat (20.3%), fiber (0.6%), ash (2.5%), water (2.4%), and starch (<1%).

B. The procedure described in Example 1, Part C, was followed. After pressing through a filter cloth the juice was centrifuged, whereby to remove starch. Coagulation and collection of the product was carried out as described in Example 1, Part C.

The results are tabulated below.

| Bisulfite (%) | Yield (g.) | ΔE (color) |
|---|---|---|
| 0 | 9.08 | 30.76 |
| 0.1 | 9.32 | 28.29 |
| 0.2 | 10.02 | 27.84 |
| 0.5 | 10.00 | 25.14 |

EXAMPLE 3

Continuous Preparation of Stable Protein Concentrate from Wheat Millfeed

Wheat millfeed (100 g.) was added to 500 ml. of water and 3 N NaOH was added to maintain a pH of about 8.6. The mixture was stirred gently for 15 minutes. Filtration as described in Example 1, Part A, produced 425 ml. of juice, which was adjusted to pH 6.0 by addition of 1 N hydrochloric acid. Approximately 60 ml. of water was added to the juice and the juice was treated with steam to a temperature of 85° C. The liquid was cooled and centrifuged at 4,000 rpm for 10 minutes.

The precipitate was recovered and dried. The supernatant liquid, about 410 ml., was adjusted to a volume of 500 ml. by addition of water. Another batch of 100 g. of wheat millfeed was then mixed with the above-described supernatant, and the aforementioned process was repeated. In total, eight cycles were performed; the average yield was 18.6 g. of product per cycle.

The protein concentrates heretofore described have either a high starch content or a very low one. A system has been devised whereby starch content can be controlled to yield a higher protein content and a selected starch content. Such products can be thus tailor-made to match the requirements of the user. This aspect of the invention is demonstrated by the following example.

EXAMPLE 4

The procedure outlined in Example 1, Part A was followed. After steaming to 85°, the hot juice was cooled. Crystalline porcine pancreatic α-amylase (330 I.U.) was added and the mixture held at 37° C. for 4 hours. The coagulated product was recovered by centrifugation and dried to give 13.5 g. of protein concentrate. This product analyzed as follows: Protein, 48.1%; fat, 10.0%; fiber, 0.5%; ash, 6%; starch, 22.5%, unidentified water-solubles, 9.5%; and water, 3.4%.

Having thus described our invention, we claim:

1. A process for preparing a stable protein concentrate from wheat millfeed, said concentrate being useful as a human food supplement, which comprises
   a. applying an aqueous alkalizer to the millfeed to adjust to a pH of 9,
   b. pressing a juice containing soluble proteins therefrom,
   c. acidifying the juice to pH 5.5 to 6.0,
   d. coagulating a solid protein concentrate within the juice by applying steam to the juice until its temperature is raised to 85° C.,
   e. separating the so-coagulated solid protein concentrate from the juice,
   f. washing the solid protein concentrate with water, whereby to lower its ash content, and
   g. drying the so-washed product.

2. The process of claim 1 wherein the alkalizer in Step a is ammonia.

3. The process of claim 1 wherein 0.1 to 1% of bisulphite ion is added to the mixture in Step a.

4. A process for preparing a stable protein concentrate from wheat millfeed, said concentrate being useful as a human food supplement, which comprises
   a. applying to the millfeed (i) aqueous ammonia to adjust to a pH of 9, and (ii) 0.1 to 1% of bisulphite ion,
   b. pressing a juice containing soluble proteins therefrom,
   c. acidifying the juice to pH 5.5 to 6.0,
   d. coagulating a solid protein concentrate within the juice by applying steam to the juice until its temperature is raised to 85° C.,
   e. separating the so-coagulated solid protein concentrate from the juice,
   f. washing the solid protein concentrate with water, whereby to lower its ash content, and
   g. drying the so-washed product.

* * * * *